US011914690B2

(12) United States Patent
Popa et al.

(10) Patent No.: US 11,914,690 B2
(45) Date of Patent: Feb. 27, 2024

(54) SYSTEMS AND METHODS FOR USING TYPING CHARACTERISTICS FOR AUTHENTICATION

(71) Applicant: TYPINGDNA Inc., Brooklyn, NY (US)

(72) Inventors: Raul-Laviniu Popa, Brooklyn, NY (US); Kyle Hunt, New York, NY (US)

(73) Assignee: TYPINGDNA INC., Brooklyn, NY (US)

( * ) Notice: Subject to any disclaimer, the term of this patent is extended or adjusted under 35 U.S.C. 154(b) by 310 days.

(21) Appl. No.: 17/336,872

(22) Filed: Jun. 2, 2021

(65) Prior Publication Data

US 2022/0253511 A1 Aug. 11, 2022

Related U.S. Application Data

(60) Provisional application No. 63/164,138, filed on Mar. 22, 2021, provisional application No. 63/146,859, filed on Feb. 8, 2021.

(51) Int. Cl.
*G06F 21/31* (2013.01)
*H04L 9/40* (2022.01)

(52) U.S. Cl.
CPC ........ *G06F 21/316* (2013.01); *H04L 63/0838* (2013.01); *H04L 63/126* (2013.01); *H04L 2463/082* (2013.01)

(58) Field of Classification Search
CPC ... G06F 21/316; G06F 21/31; H04L 63/0838; H04L 63/126; H04L 2463/082; H04L 9/40
See application file for complete search history.

(56) References Cited

U.S. PATENT DOCUMENTS

| 9,514,293 | B1 | 12/2016 | Moritz et al. | |
| 10,050,787 | B1* | 8/2018 | Johansson | H04L 9/0866 |
| 11,418,502 | B2* | 8/2022 | Dickenson | H04W 12/68 |
| 11,531,735 | B1* | 12/2022 | Patel | G06F 21/316 |
| 2012/0054057 | A1 | 3/2012 | O'Connell et al. | |
| 2013/0167212 | A1 | 6/2013 | Azar et al. | |
| 2016/0140335 | A1* | 5/2016 | Proulx | H04L 9/0863 726/6 |
| 2016/0171197 | A1 | 6/2016 | Song et al. | |
| 2016/0259924 | A1 | 9/2016 | Dutt et al. | |
| 2018/0288031 | A1* | 10/2018 | Kumar | H04L 63/0807 |

(Continued)

*Primary Examiner* — Jayesh M Jhaveri

(57) ABSTRACT

Disclosed herein are methods, devices, and systems for provide a new two-factor or user authentication procedure. In a scenario in which a user is enrolled in the verification system, a method can include receiving, at a network-based server, a unique identifier associated with a user that desires to access a service from an application or a website, identifying a typing profile associated with the unique identifier and presenting a reference text on a user device of the user. The method can include receiving a typing pattern of the user and determining whether there is a match between the typing pattern and one or more previously recorded typing patterns for the user. When the determination indicates that the user is verified, the method includes presenting a one-time password on a display of the user device. The user enters the one-time password into an input field and validating, via the network-based server, the one-time password.

26 Claims, 9 Drawing Sheets

(56) References Cited

U.S. PATENT DOCUMENTS

| | | |
|---|---|---|
| 2019/0347285 A1 | 11/2019 | Yun et al. |
| 2020/0220720 A1* | 7/2020 | Hopkins ............... H04L 63/083 |
| 2020/0245918 A1 | 8/2020 | Dagum |
| 2020/0358787 A1* | 11/2020 | Barker ................. H04L 63/123 |
| 2022/0318800 A1* | 10/2022 | Levionnais ............. G06F 21/31 |

* cited by examiner

SYSTEMS AND METHODS FOR USING TYPING CHARACTERISTICS FOR AUTHENTICATION

PRIORITY INFORMATION

The present application claims the benefit of U.S. Provisional Application No. 63/146,859, filed Feb. 8, 2021 and U.S. Provisional Application No. 63/164,138, filed Mar. 22, 2021, the contents of which are incorporated herein by reference.

TECHNICAL FIELD

The present disclosure generally relates to improvements in user authentication for access to services and particularly to analyzing how a user types in a text, in comparison to stored data, for authentication purposes.

BACKGROUND

User authentication is an important feature in accessing applications or certain services such as banking accounts. Typically, a user will be granted access to a service after successfully passing a two-factor authorization process. The two-factor authorization can include the user entering their username and standard password. The system will then send a one-time password or code (OTP) to an email address or mobile phone via an SMS text. The user than enters the OTP code into the site or an application to gain access.

This process is cumbersome at least in part because the app or the website that the user desires to access is often on the same device that they would receive the email or the OTP. Therefore, the user has to leave the current application they are desiring to access, open a messaging or email application, view or remember the OTP from the email or text, and then return to the application and enter in the OTP code into a field. In some cases, two devices are used. One device, such as a desktop computer, is used to access the service while a second device, such as a mobile phone, is used to receive the OTP in a text message.

SUMMARY

The present disclosure generally relates to improvements in user authentication and particularly to utilizing typing characteristics of a text for authentication purposes. Note that the text disclosed herein differs from the user password in that the approach of evaluating the typing characteristics of reference text and is independent of a password analysis or matching operation.

What is needed in the art is an improvement with respect to the user authentication for enabling a user to access an application or a service. The disclosed approach addresses this problem fundamentally by integrating user authentication into the website or application such that when a user reaches the user authentication step, a window is presented to the user. The window displays one or more words for the user to type. As the user types the displayed words, the user's typing pattern is received and verified. Enrolled users will have data regarding their patterns of typing the particular words or similar words. If the typing pattern is verified, a one-time pass code is displayed in the window. The user can then enter the one time pass code into the website or application and gain access as desired. If the typing pattern fails verification or the user is not enrolled in the system, then the process can default to the one-time pass code being sent to a phone or an email address according to the standard procedure.

A first example method addresses a scenario where a user is unenrolled in an authentication system. In this example, a method includes identifying that a user is at a stage of accessing a service requiring user authentication, presenting a word for the user to type and receiving typing characteristics related to how the user types the word. The method then can include determining, based on the typing characteristics, whether the user is verified to yield a determination. When determination indicates that the user is verified, the method includes presenting a one-time password to the user on a user device. When determination indicates that the user is not verified, the method includes transmitting the one-time password to the user device via a text or an email.

In another example which relates to a scenario when the user is enrolled in the system, a method includes receiving, at a network-based server, a unique identifier associated with a user that desires to access a service from an application or a website, identifying a typing profile associated with the unique identifier and presenting a reference text on a user device of the user. The method can include receiving a typing pattern of the user as the user types the reference text in the user device and determining whether there is a match between the typing pattern and one or more previously recorded typing patterns for the user to yield a determination. When the determination indicates that the user is verified, the method includes presenting a one-time password on a display of the user device, wherein the user enters the one-time password into an input field associated with the service and validating, via the network-based server, the one-time password.

In yet another example which relates to a scenario when the user is enrolled and verification fails, a method includes receiving, at a network-based server, an indication from a user device to initiate a verification service to enable a user to gain access to a service on the user device, based on the indication, presenting a window on the user device to enable user interaction related to authentication, receiving, at the network-based server, a unique identifier associated with the user that desires to access the service and identifying a typing profile associated with the unique identifier. The method can then include presenting a reference text on the user device, receiving a typing pattern of the user as the user types the reference text and determining whether there is a match between the typing pattern and one or more previously recorded typing patterns for the user to yield a determination. When the determination indicates that the user is not verified, the method includes transmitting a one-time password to the user device via a text or email, wherein the user enters the one-time password into an input field associated with the service and adding the typing pattern to a user profile at the verification service.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Embodiments can also include systems or computer-readable media with instructions to control a processor to perform the functions disclosed herein. The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
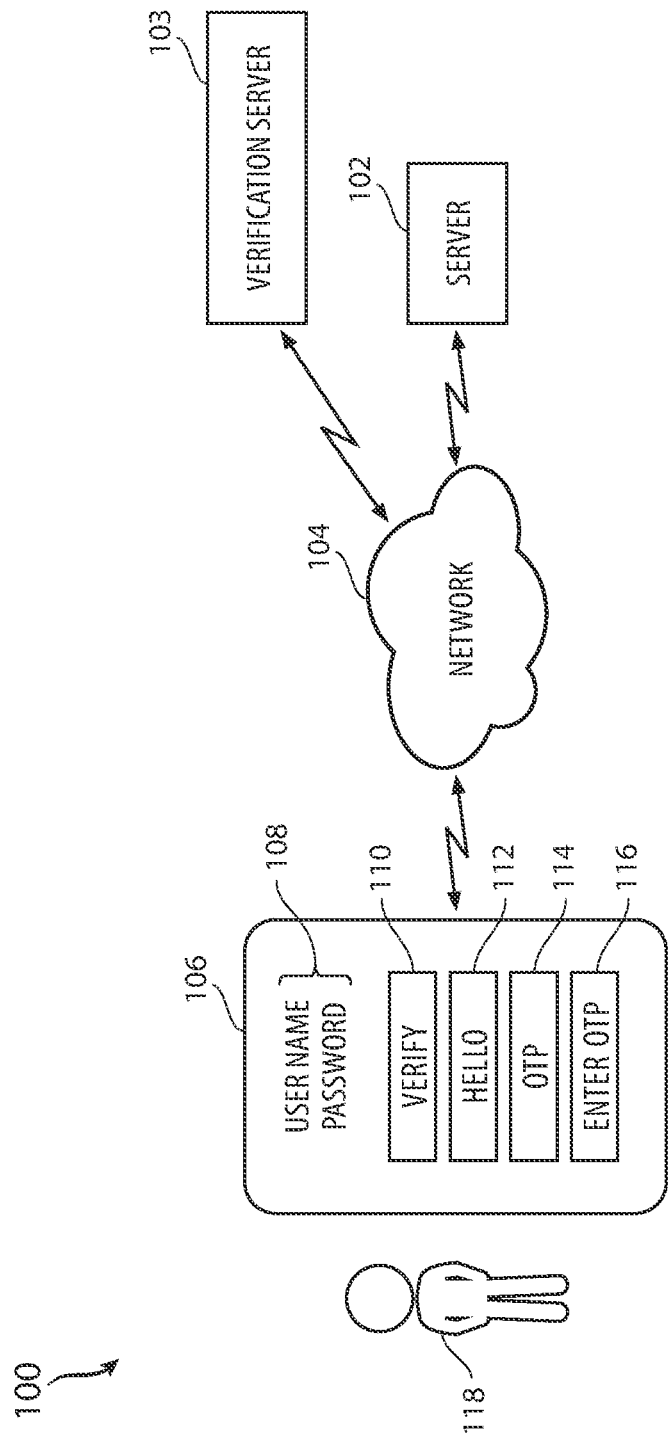
FIG. 1 illustrates an example network in which this authentication approach can be applied.

FIG. 1 illustrates an example of the system 100 which is applicable to the user authentication approach disclosed herein. The main objective of this disclosure is to describe several novel approaches which relate to analyzing user typing styles or characteristics for tailored reference words to see if there is a match in the typing characteristics to stored data for that user. The stored data can be one or more previously recorded typing patterns for the user. Utilizing the user's typing characteristics can aid in making a user authentication process more user friendly and simple to implement. Thus, secure access to services such as bank accounts remains strong while improving the user experience in gaining access to their services. The term "user authentication" can mean a single-factor authentication, a two-factor authentication, or can mean three or more factors. Where multiple factors are used, they may be of the same type or different types of modalities of authentication, such as biometric (fingerprint, iris, facial recognition), password, reference text typing characteristics analysis, speech analysis, voice authentication, and so forth. The steps disclosed herein can be implemented at any stage of a user authentication process. For example, the typing analysis can be the second factor in a three-factor authentication process, or may be the third factor, and so forth. All variations of the number of factors and which factor applies the typing analysis are within the scope of this disclosure.

As shown in FIG. 1, a user client device 106 can communicate via a network 104 such as the Internet with a network-based server 102. The network-based server 102 can represent any network-based component such as a cloud-based server, virtual server, hardware server, or any physical or virtual computing environment which can perform the operations described herein. In one aspect, the server 102 can store the computer code to operate a website such as a banking application that the user 114 desires to gain access to for banking purposes and that might require user authentication. In another aspect, the user device 106 can include an application that the user desires to access. The user authentication process can be single-factor or might be a multi-factor authentication process. The application on the user device may also have some back-end functionality provided by the server 102. The verification server 103 can be integrated into the use of the application or website for performing the verification of the typing patterns of the user. In another aspect, the verification process for the typing characteristics can be performed locally on the user device 106.

Generally, the network-based server 102 can be called a "server" which can refer to any of the various embodiments described above. Such a network-based server or cloud environment 102 can encompass the files, applications, databases, data centers, virtual environments, operating systems, networking hardware and software, and so forth. It can include any components related to one or more of providing a Software-as-a-Service (SaaS) environment, a Platform-as-a-Server (PaaS) environment, an Infrastructure-as-a-Service (IaaS) environment, or a Function-as-a-Service (Faas) environment. The network-based server 102 can be part of a private cloud, a public cloud, a hybrid cloud, or a multi-cloud environment.

The client device 106 can include a computer, laptop, iPhone, mobile device, desktop computer, watch, and so forth. The client device 106 can be also described as a user equipment that is used by the user for other purposes such as surfing the Internet at home, checking email, performing computer-assisted tasks such as writing documents or editing images or video. The client device 106 can access the server via a browser on the device 106 or can have applications downloaded thereon for access a service. The applications downloaded on the client device 106 can also access the server 102 for back-end functional support. The server 102 or the server 103 can be programmed with various program modules that are configured with computer-readable instructions to make the servers 102, 103 a specialized computer system in connection with the client device 106 and its components.

Figure 2A:
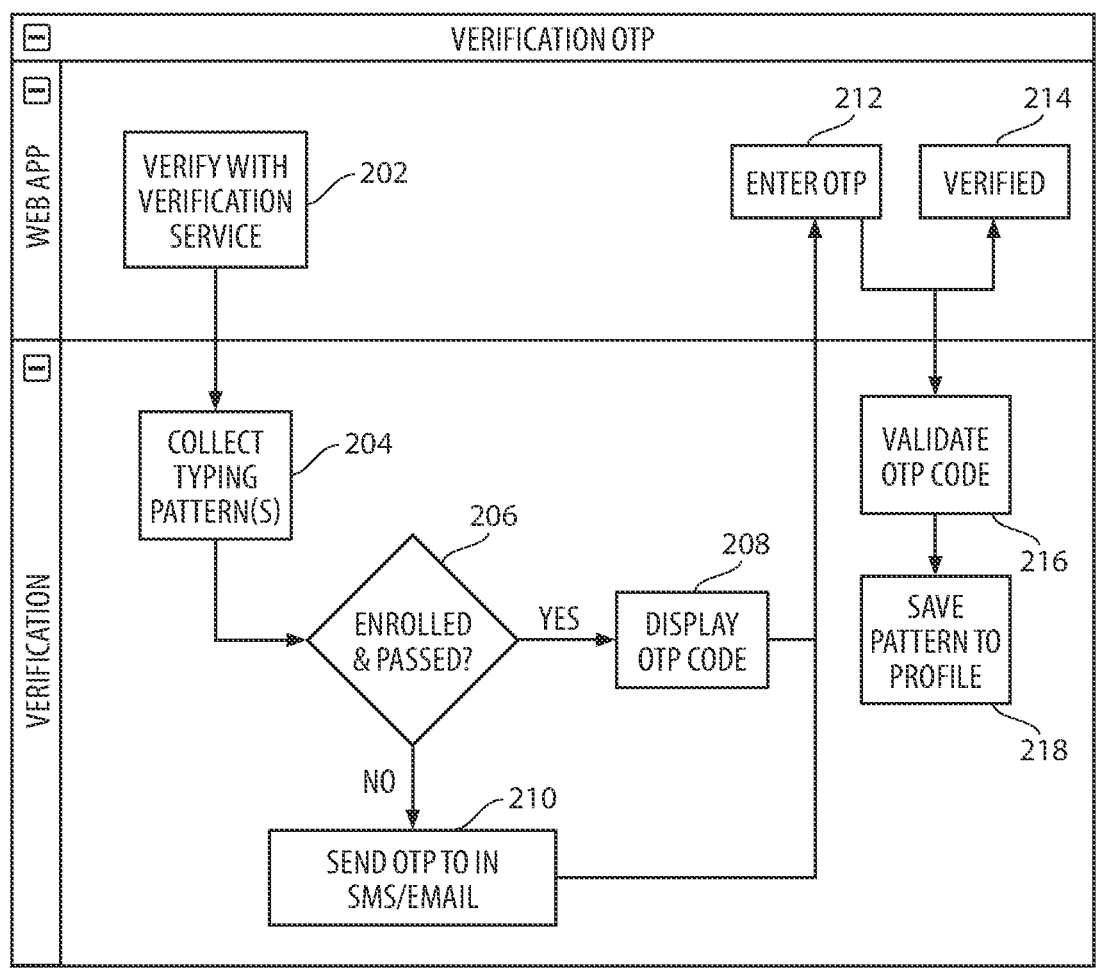
FIG. 2A illustrates an example one-time password flow according to an aspect of this disclosure.

FIG. 2A illustrates verification OTP flow 200. In one aspect of this disclosure, a user will desire to use a web application, an application download on their user device, or a website. Generally, when an "application" or "service" is referenced, it can be a web app, a downloaded application or a website that provides an account or service that the user desires to access and that requires a level of security to enable the access. As a user gets to a state after which they enter in a login name and password for the application, an object such as a selectable button could be presented in a window or otherwise. Initiation of the verification service can occur in several ways. The user can interact with the object (such as a button) to select verification using a verification service as described herein. In another aspect, the verification service might be a default offering for users to verify themselves. A window may automatically be presented when a user logs into a service and is in a state where a user authentication is proper. Block 202 illustrates a state in which a user has requested verification with a verification service. In one respect, this can mean that communication is established between the application and the verification server 103. The communication can be performed through a validation application programming interface (API) between the service (application, web app, web site) and the verification server 103.

Figure 2B:
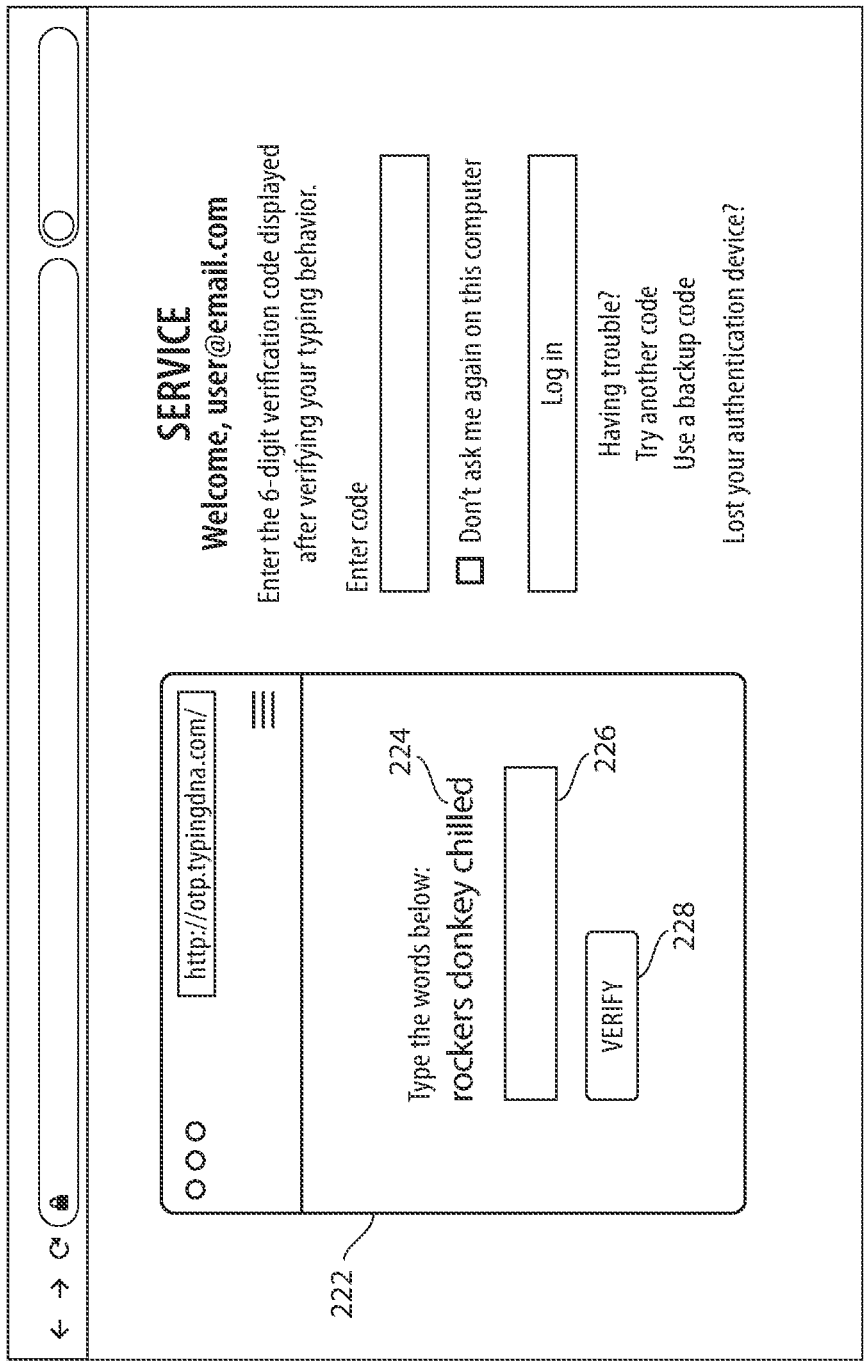
FIG. 2B illustrates a window with reference text for the user to type.

The verification server 103 can present a window in a user display on the user device number 106 with a reference text. FIG. 2B illustrates an example window 222. The reference text can be constructed in such a way to probe the user typing characteristics. For example, the reference text can include "west people" which includes letters from the left side of the keyboard, the right side of the keyboard, the top of the keyboard and in the middle portion of the keyboard. The text requires the user to move their fingers in various places throughout the keyboard which enables more robust typing patterns to be received. In contrast, if the user was asked to type the reference text "ooooh", the movement of the person's fingers are only on two different keys and the keys are relatively close to each other and of course repetitive. Such a reference text would not be very proactive of the typing characteristics or typing pattern of user. Although such simple text is included as within the scope of this disclosure, more robust text in terms of being probative of how a user types is preferred. Accordingly, the choice of the reference text is tailored to probing the typing pattern or characteristics for the user. The level of probity of how complicated the reference text is can also be chosen or tailored based on a number of parameters, such as how secure the application needs to be, when the access is desired, a confidence level of the identification of the user prior to presenting the reference text, past history of access, and so forth.

One aspect of this disclosure relates to selecting the reference text for a particular user. For example, a user with a very robust user profile that contains many typing patterns for previously authorized and verified typing pattern entries may not require a reference text that is highly robust in terms of its probative value. A more simple reference text might be presented to such a user. In another aspect, a new user, or where there might be some suspicion regarding the particular user because they have had multiple tries to gain access to the application, with many password mistakes, could cause the system to present a more robust and challenging reference text as part of the verification process described herein.

Machine learning algorithms can be used to classify a state of the user in terms of the level of risk or confidence that is associated with the user. Such a classification can be used to generate the type of reference text that would be appropriate to receive a typing pattern from the user as they type in the reference text. The system collects the typing pattern 204 and determines whether the user is enrolled in the system and passes the verification test as represented in block 206. The verification can occur by comparing the typing pattern received for the reference text with stored typing patterns in a user profile. The system can determine whether the user is enrolled and/or whether the user passes the verification test based on the current typing pattern being compared to previous typing patterns that are stored in the user profile.

If the user passes the test in block 206, the verification system will display a one-time pass code (OTP) on the user device number as shown in block 208. One advantage of this approach is that the displaying of the OTP code can occur in a window on the same display as the application the user desires to gain access to. Previous approaches require the user to switch to a different display, a different application or even a different device in order to retrieve, from a texting application or an email application, the OTP code and then write it down or memorize it and then return to the desired application to enter in the OTP code. This is a cumbersome process.

In the new scenario, a window can be presented which is adjacent to an input field of the application that is to receive the OTP code. Thus, the user experience is improved because there is no need to change displays, applications, or devices in order to gain access to the OTP code and then enter the OTP code into the input field. A window can show the OTP code on the same display as the input field of the application that needs to receive the OTP code. The OTP code can be, for example, a 6 digit or alpha-numeric code. The structure and number of characters in such a code is variable and is not limited by any specific example disclosed herein. Other characters beyond alphabet and numeric characters can be used as well. The OTP code is any type of generated code, regardless of generation algorithm/code length/format/etc. Furthermore, the OTP code may not necessarily be a one-time use only code, but could be any code used for verification/validation purposes. For example, a user may have their own private OTP code that they can use for verification/validation that is not just one-time use.

In another aspect, if the user is not enrolled or does not pass the verification test as shown in block 206, the system can send the OTP code to the user device or another device via SMS or email 210 in the standard manner. Either way, the user will enter the OTP code into the input field in the application 212. The verification service can include an application programming interface or other secure communication approach with the application (web app, downloaded application, or website, etc.) and verify the OTP code 214. Other entities can also verify the OTP code 214. The verification service 103 can then receive confirmation or validate the OTP code 216 and save the typing pattern to the user profile as shown in block 218. In this manner, the user profile continues to expand its breadth of typing pattern data for that user and continues to improve in terms of its ability to properly evaluate new typing patterns based on new received reference texts to further confirm user authentication.

Some of the benefits of this approach include an improvement in the user experience. As noted above, one benefit of this approach is that acquiring an OTP code does not require changing applications or changing devices for already registered users. In some cases, the user may need to access a text application or an email account but that typically will be in the scenario of enrolling a new user or in the few cases in which the user who is already enrolled for some reason is not verified. The approach of using typing patterns also is much more affordable for companies that offer applications. Generating an SMS text is costly to scale as each text costs money to generate and send. The approach disclosed herein provides a secure alternative for a majority of use cases and can save companies a lot of money as they perform user authentication to enable access to their services.

The disclosed approach is also flexible. The fallback channel approaches for initial enrollment, where the separate OTP code can be sent either through an SMS text or an email, are all supported channels. Other channels might be supported as well such as application programming interfaces. This approach allows for customers wishing to support SMS OTP codes to do so at their expense. There also can be a free version in which email only is offered without the use of costly SMS text. Various pricing models can be used to implement the solution described herein. Supporting typing biometrics plus email support as a fallback channel or for initial enrollment can be made freely available.

For the majority of cases, the fallback channels are expected to be email or text. However, this disclosure includes support for a variety of different channels for fallback or any type of communication with the user seeking to be authenticated. For example, the fallback channel can include a communication through WhatsApp, a voice call, a social media communication of any type (posting, messaging, etc.), or any other channel of communication.

Finally, the approach disclosed herein enables a centralized process using a verification service 103 to handle the interactions and verification for users. The approach can be easy to utilize on various applications websites and web apps due to its centralized nature.

Figure 2C:
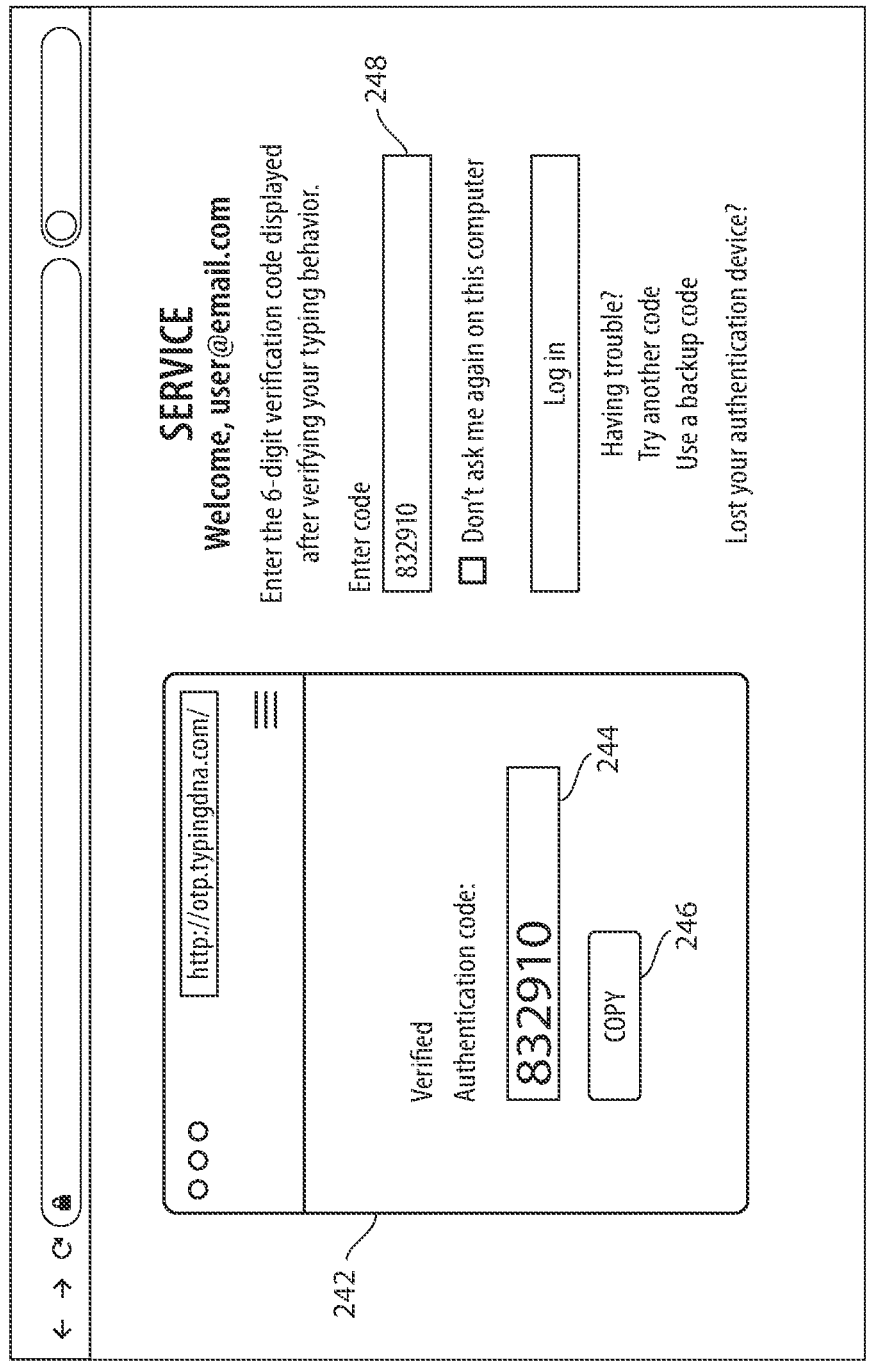
FIG. 2C illustrates the window with the OTP code provided therein.

FIG. 2B illustrates a display 220 that includes a window 222 with reference text 224 "rockers donkey chilled" for the user to type in. The user can then click on an object such as a "verify" button 228 to initiate the verification process. Note that the window 222 is presented on the same display 220 as the service that the user desires to access which includes the input field for the code. FIG. 2C illustrates a verification window 242 within a display 240 and showing the OTP code 244. The user can click on a "copy" object 246 and copy and paste the OTP code 244 into the user input field 248. Note that the window 242 is to the side of the input field 248 such that the user does not have to manipulate applications, devices or screens to see, copy and enter the OTP code where it is needed. In one aspect, the system can analyze the user interface 240 so as to identify the position of the input field 248 and strategically position the window 242 in shape, size and/or location on the display 240, such that the user can read the code 244 and enter it into the input field 248 or cut and paste it through the use of the object 246 without the need of moving or manipulating the window 242 or making any other manipulation of the user interface to achieve the task.

The call-out feature 220 in one aspect above represents a display. In another aspect, it can represent a client window 220, or in other words an application or website (presented via a browser) that is loaded onto the client computer. The client window 220 can communicate with a network-based server 102 as well which can present data, graphical images, receive and process input (such as the one-time code) and general provide the service that the user desires to access.

Figure 3:
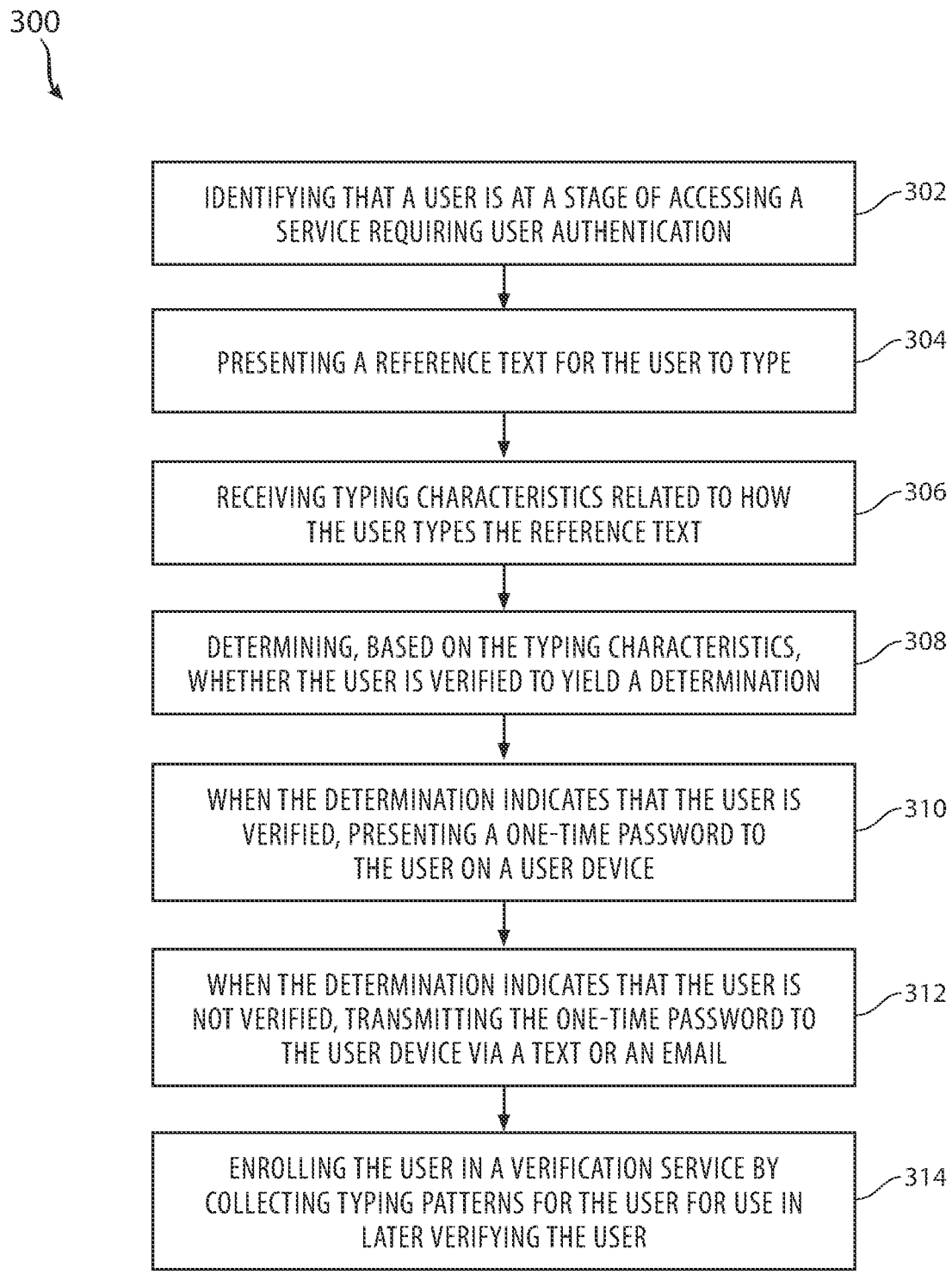
FIG. 3 illustrates an example method when a user is unenrolled according to an aspect of this disclosure.

FIG. 3 illustrates a method for use with an unenrolled user with a separate device or phone used as a fallback channel approach to achieving proof of identity. The method 300 can include identifying that a user is at a stage of accessing a service requiring user authentication (302), presenting a reference text for the user to type (304), receiving typing characteristics related to how the user types the reference text (306) and determining, based on the typing characteristics, whether the user is verified to yield a determination (308).

Initiation of the use of a reference test or words for verification can be caused by the user clicking on an object or interacting with an object that indicates the desire to use a verification service related to evaluating a typing pattern for the reference text. The reference text could be a reference word that is constructed for the individual user with a certain level or threshold of complexity with respect to the user typing the reference text or words on a keyboard. As noted above, a more robust or complex reference text or words can be provided to cause the user to touch keys on the keyboard in different locations or in a particular order which is more probative of the user's typing patterns than one might obtain from the user simply typing the same letter over and over. The verification service can present the reference text in a window managed by the verification service for the user to type. The verification service can receive the typing characteristics or typing patterns related to how the user types the reference text or words and determines whether the user is verified to yield or generate a determination.

The method further includes, when the determination indicates that the user is verified, presenting a one-time password to the user on a user device (310) and, when the determination indicates that the user is not verified, transmitting the one-time password to the user device via a text or an email (312). The user can be verified based on the typing characteristics or typing pattern by comparing the typing characteristics to collected typing patterns for the user in a user profile.

The method can further include enrolling the user in a verification service by collecting typing patterns for the user for use in later verifying the user (314). The method may include, when the user is already enrolled, updating a user profile for the user when the user is verified by adding the typing characteristics to the user profile.

In one aspect, the determining step referenced above can further include determining whether the user is enrolled in an authentication service. The step of presenting a one-time password to the user can further be based on whether the user is enrolled in the authentication service.

When the user is already enrolled, the step of presenting a one-time password to the user can be performed without sending the text or the email to the user device. Presenting the one-time password to the user further can include presenting the one-time password in a window on a same display as an input field for the one-time password such that the user can both read the one-time password from the window and type in the one-time password without switching screens on the user device or performing some other window manipulation to achieve the task of reading the OTP and entering it into the proper input field. This enables the user not to have to switch devices or memorize an OTP code, but simply read the OTP code from the window and enter in the OTP code in the input field associated with the service they desire to use. Prior to presenting a word for the user to type, the method can include presenting an option on the user device for the user to verify based on the typing characteristics and receiving a selection from the user based on the option to verify based on the typing characteristics. In another aspect, the verification service can be the default mode. The service the user desires to access can be one of a website or an application downloaded on the user device.

The verification service can provide the OTP and then have an API or other secure communication between a server 102 associated with the service and the verification server 103 so that the service can transmit the OTP back to the verification service for confirmation.

Figure 4:
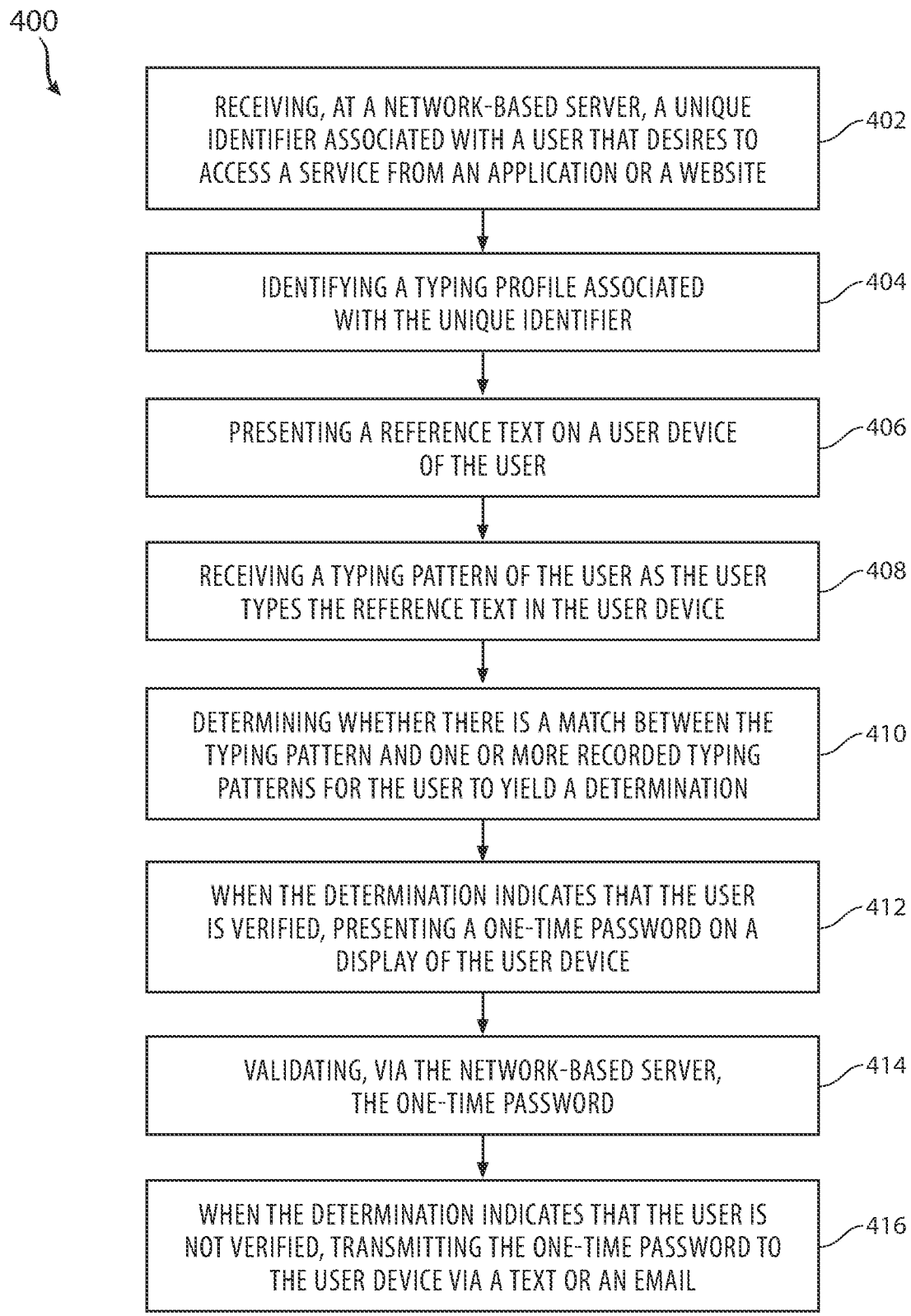
FIG. 4 illustrates an example method when the user is enrolled according to an aspect of this disclosure.

FIG. 4 illustrates another method 400 related to an enrolled user seeking verification and using an SMS/email approach as a fallback channel for achieving a proof of identity and wherein the user passes the verification. The method 400 includes receiving, at a network-based server, a unique identifier associated with a user that desires to access a service from an application or a website (402), identifying a typing profile associated with the unique identifier (404), presenting a reference text on a user device of the user (406), receiving a typing pattern of the user as the user types the reference text in the user device (408), determining whether there is a match between the typing pattern and one or more previously recorded typing patterns for the user to yield a determination (410), and when the determination indicates that the user is verified, presenting a one-time password on a display of the user device (412). The user can then enter the one-time password into an input field associated with the service. The method further includes validating, via the network-based server, the one-time password (414). The system can also enable the user to copy the OTP through an object the user interacts with so that the OTP is copied onto a virtual clipboard for pasting into the proper input field.

The unique identifier can include one of a phone number or an email address or other identifier. When the determination indicates that the user is not verified, the method can include transmitting the one-time password to the user device via a text or an email (416).

In one aspect, presenting the reference text on the user device can be performed such that the user can enter the one-time password into the input field associated with the service on a same display such that the user does not need to switch applications.

Figure 5:
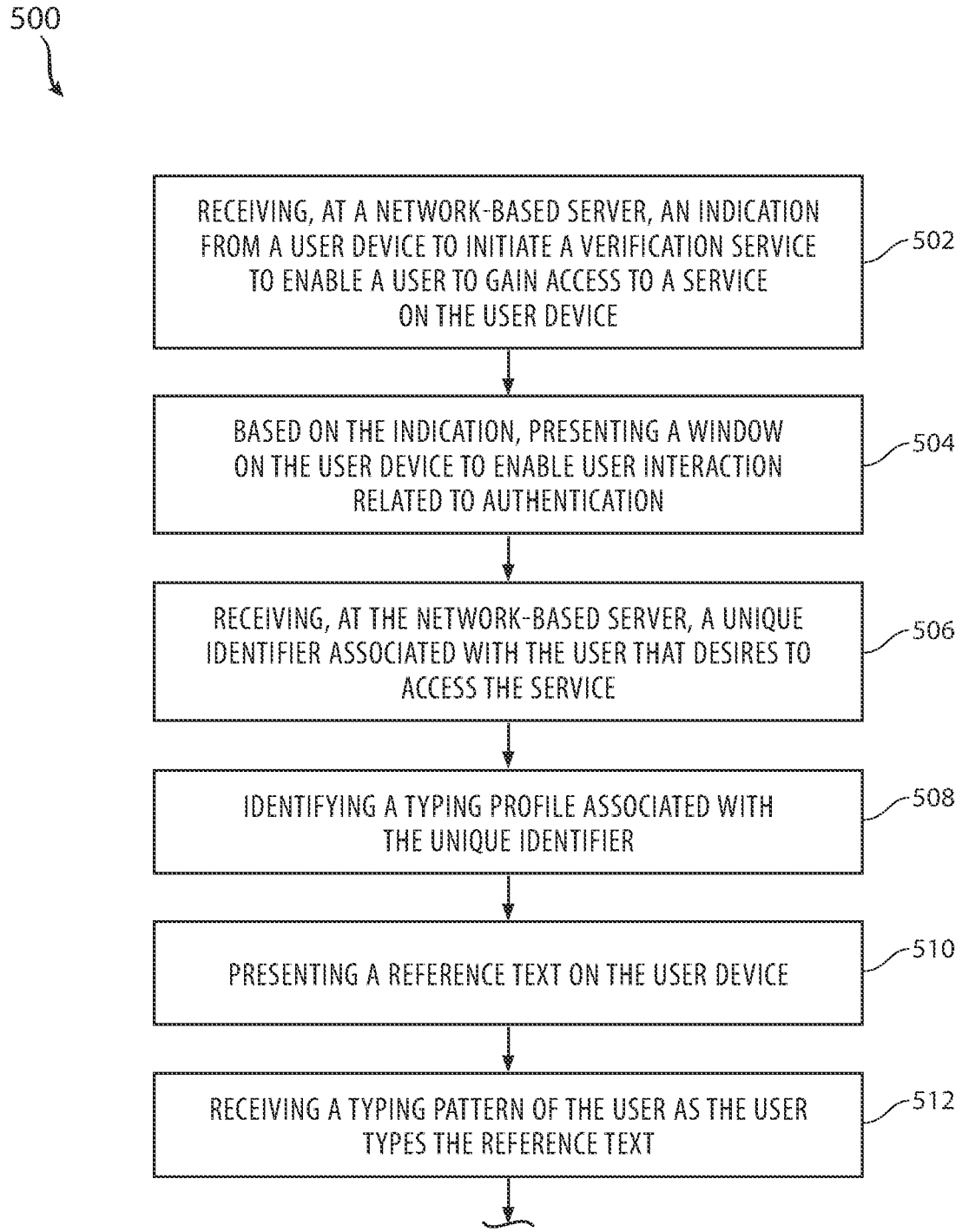
FIG. 5 illustrates an example method according to when the user is enrolled and verification fails according to an aspect of this disclosure.
Figure 5:
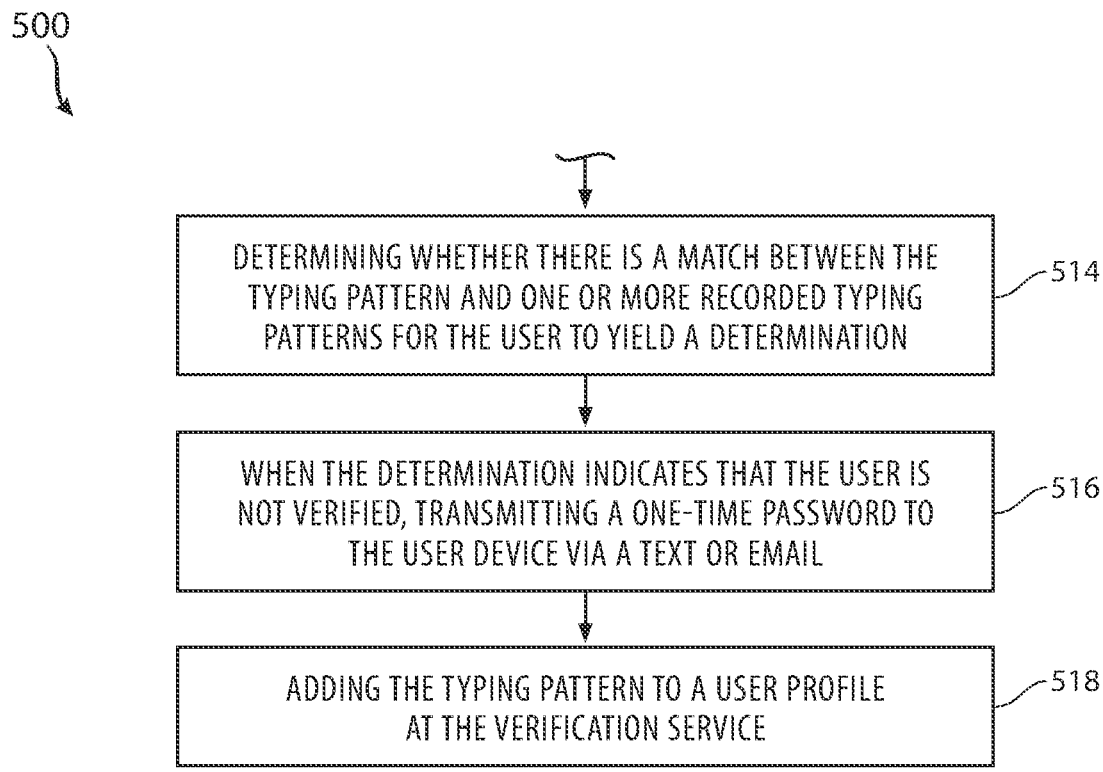

FIG. 5 illustrates another method 500 related to an enrolled user that fails a verification. The method 500 can include receiving, at a network-based server, an indication from a user device to initiate a verification service to enable a user to gain access to a service on the user device (502), based on the indication, presenting a window on the user device to enable user interaction related to authentication (504), receiving, at the network-based server, a unique identifier associated with the user that desires to access the service (506), identifying a typing profile associated with the unique identifier (508) and presenting a reference text on the user device (510). The presenting the reference text can be in a window on a same display as input fields for the application. In another aspect, the solution (text display and entry flow) can be surfaced in a number of different ways. For example, the functionality and graphical interface can be embedded in a customer page (webpage or application page) itself, embedded via an iframe, opened in a separate tab in the same browser window, or in a new browser window, etc. Thus, this disclosure is not limited to surfacing the user interface to achieve the authentication within the same display, window or browser that the user is currently interacting with. The solution could also be surfaced, for example, on a separate device through a social media application that the user is registered with.

The method can include receiving a typing pattern of the user as the user types the reference text (512), determining whether there is a match between the typing pattern and one or more previously recorded typing patterns for the user to yield a determination (514) and, when the determination indicates that the user is not verified, transmitting a one-time password to the user device via a text or email (516). The user can enter the one-time password into an input field associated with the service. The method then includes adding the typing pattern to a user profile at the verification service (518).

The service can be offered from an application on the user device or a website accessed from the user device. Each different type of service can have an appropriate secure communication to the verification service. The user can be enrolled in the verification service and the typing pattern can be added to the user profile for use in a later verification.

In one aspect, adding the typing pattern to the user profile at the verification service further can include enrolling the user at the verification service and using the typing pattern added to the user profile in a later verification. In another aspect, presenting the reference text on the user device further can include presenting the reference text in the window. For an improved user experience, the window does not overlap the input field associated with the service such that the user can read the one-time password and enter it into the input field without switching screens.

Figure 6:
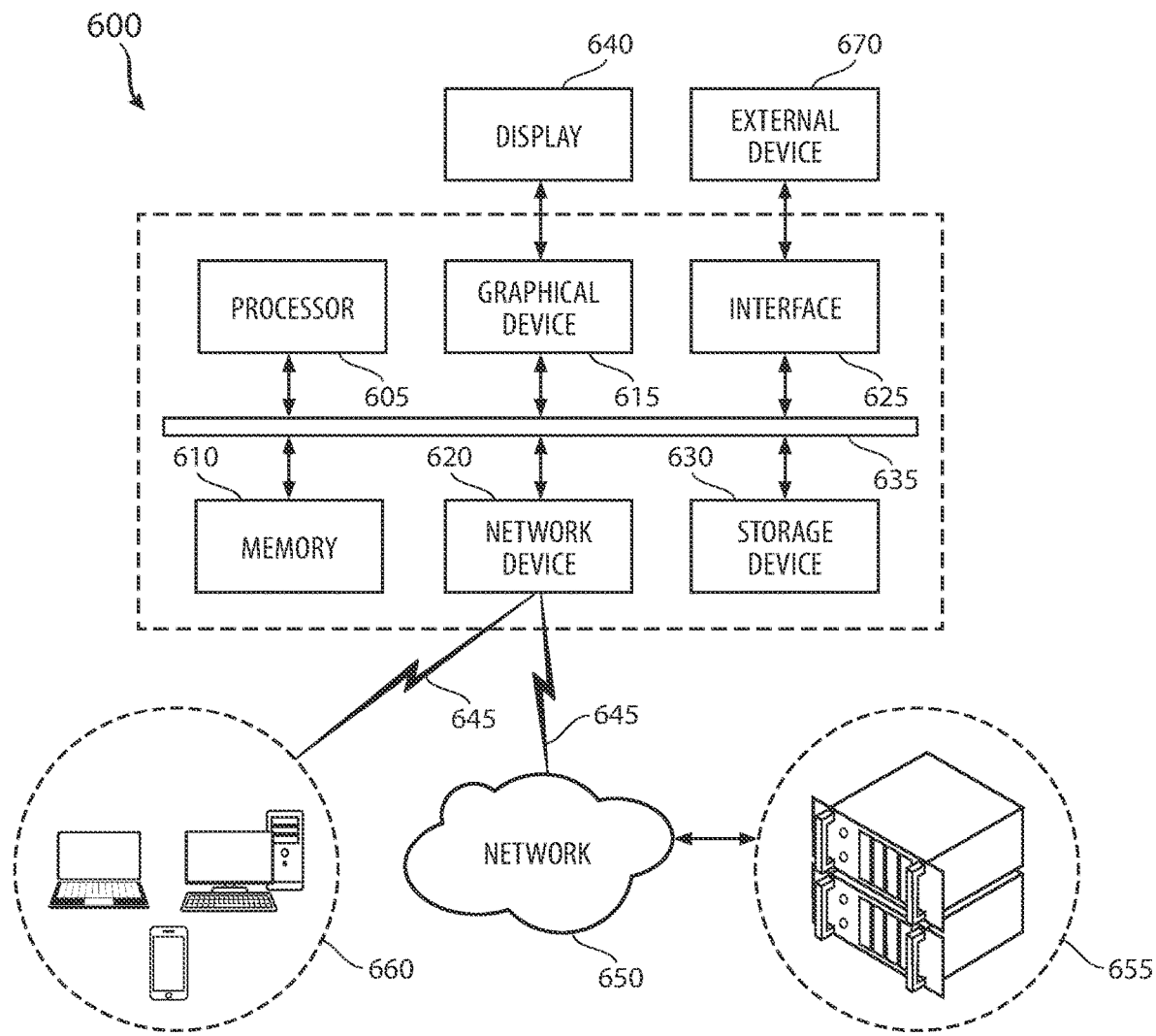
FIG. 6 illustrates an example system or device according to some aspects of this disclosure.

FIG. 6 illustrates an example computer system 600 for implementing a part of the instant disclosure. For example, the example computer system 600 may execute a client application for performing the instant disclosure. The example computer system 600 includes a processor 605, a memory 610, a graphical device 615, a network device 620, interface 625, and a storage device 630 that are connected to operate via a bus 635. The processor 605 reads causes machine instructions (e.g., reduced instruction set (RISC), complex instruction set (CISC), etc.) that are loaded into the memory 610 via a bootstrapping process and executes an operating system (OS) for executing application within frameworks provided by the OS. For example, the processor 605 may execute an application that executes an application provided by a graphical framework such as Winforms, Windows Presentation Foundation (WPF), Windows User Interface (WinUI), or a cross platform user interface such as Xamarin or QT. In other examples, the processor 605 may execute an application that is written for a sandbox environment such as a web browser.

A module can be programmed instructions stored in memory to control a processor to perform specific operations. So programmed, the computer becomes a special purpose computer specifically programmed to perform functions.

The processor 605 controls the memory 610 to store instructions, user data, operating system content, and other content that cannot be stored within the processor 605 internally (e.g., within the various caches). The processor 605 may also control a graphical device 615 (e.g., a graphical processor) that outputs graphical content to a display 640. In some example, the graphical device 615 may be integral within the processor 605. In yet another example, the display 640 may be integral with the computer system 600 (e.g., a laptop, a tablet, a phone, etc.).

The graphical device 615 may be optimized to perform floating point operations such as graphical computations, and may be configured to execute other operations in place of the processor 605. For example, the processor 605 can be controlled by instructions to perform mathematical operations optimized for floating point math. For example, the processor 605 may allocate instructions to the graphical device 615 for operations that are optimized for the graphical device 615. For instance, the graphical device 615 may execute operations related to artificial intelligence (AI), natural language processing (NLP), vector math. The results may be returned to the processor 605. In another example, the application executing in the processor 605 may provide instructions to cause the processor 605 to request the graphical device 615 to perform the operations. In other examples, the graphical device 615 may return the processing results to another computer system (i.e, distributed computing).

The processor 605 may also control a network device 620 that transmits and receives data using a plurality of wireless channels 645 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 620 may wirelessly connect to a network 650 to connect to servers 655 or other service providers. The network device 620 may also be connected to the network 650 via a physical (i.e., circuit) connection. The network device 620 may also directly connect to local electronic device 660 using a point-to-point (P2P) or a short range radio connection.

The processor 605 may also control an interface 625 that connects with an external device 670 for bidirectional or unidirectional communication. The interface 625 is any suitable interface that forms a circuit connection and can be implemented by any suitable interface (e.g., universal serial bus (USB), Thunderbolt, and so forth). The external device 665 is able to receive data from the interface 625 to process the data or perform functions for different applications executing in the processor 605. For example, the external device 665 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

The principles or concepts disclosed herein can be performed by the client device 106, the server 102, another computing device such as a device with various input/output components. Downloaded applications on user devices, "App Clip" code from Apple which includes small snippets of functional code, or browser-based user interfaces can be used in connection with the functionality disclosed herein.

It is noted that in one aspect, the steps disclosed herein can be practiced by a "system." The system can include the server and one or more clients together, or might just be functionality performed by the server. The system could also be a client or a group of clients, such as clients in a particular geographic area or clients groups in some manner that are performing the client-based functions disclosed herein. Claims can be included which outline the steps that occur from the standpoint of any device disclosed herein. For example, the steps of transmission and receiving of data can be claimed from the standpoint of a server device, a client device, or group of client devices depending on which embodiment is being covered. All such communication from the standpoint of an individual component or device can be included as within the scope of a particular embodiment focusing on that device.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For example, the enrollment/registered user check or verification can occur before or after collecting typing patterns. The reference texts or enrollment texts do not have to have a particular pattern. They do not have to be four words, one sentence, etc. Any text can be used as the "reference text" to enter. The text can be the same every time, tailored for a particular user, more or less complex depending on the type of service being accessed (a game versus a bank account), and so forth. The reference text can be any combination of characters, of any length, including a word, series of words, phrase/sentence, or alphanumeric text. The text could be randomly generated. The reference text can be dynamically chosen based on the risk of the user's authentication circumstances. Note that the dynamically-chosen reference text is one example of how the reference text can be generated. This disclosure is not limited to this approach, as the text may be static and/or constant for a given user, especially initially. The text may also be constant for a defined group of users which can change periodically as well. Any mention of the reference text being a "word" or "words" does not necessarily mean that the reference text is an accepted word (in any language), but it could also mean an arbitrary text or structured text that isn't technically a word. The reference text could therefore be a word or a group of characters (alphanumeric and/or otherwise) that does not constitute a standard word.

The biometric data described above relates to typing patterns for users, but other biometrics such as fingerprint recognition, facial recognition, voice recognition can also be blended in with the typing patterns described for authentication purposes. Such other biometric data can also replace the typing patters as well. Any mixture of biometric data can be used for authentication according to the principles described above.

In one aspect of this disclosure, the use of the reference text and typing characteristics in the context of user authentication could be a single factor or multi-factor authentication procedure or swapped out for an alternate authentication approach. Thus, this disclosure includes the concept of using a facial identification technique, a fingerprint identification technique, iris analysis, infrared analysis, speech analysis, or other biometric approach in place of or in addition to the typing analysis described herein.

In another variation, the typing patterns are typically described above as centralized for the user or for the particular device when a phone number or email address is used for verification. However, while in one aspect, the system may centralize the typing patterns for each phone no/email, another approach may make the typing patterns site specific or application specific.

The system could also use webhooks or callbacks rather than OTP manual entry for communication between the verification service 103 and an origin application. For example, the system can use a callback between the popup window 222 and the client window 220. In this example, the client window 220 can represent an application or website loaded on or served via a browser on the client device. It can communicate in any embodiment with a back-end network-based server 102. The popup window 220 could also use a callback or webhook to call a client server 102 that is serving up or managing the client window 220. Communications between the verification server 103 and the client window 220 or the client server 102 can also occur via webhooks, callbacks, or other mechanisms. An application programming interface can be used to make such calls. The callback mechanism provides the OTP code 208 to the client window 220 or the client server 102 using a different communication channel such that the user does not have to manually enter the OTP 212. In one aspect, the OTP code 244 is shown in the verification window 242 so that user can see the OTP code 244, but at the same time, the OTP code 244 is passed to the client window 220 and/or client server 102 such that the user does not have to type it in manually or cut and paste it. Upon the user being verified through the typing analysis, the OTP code 244 can be transmitted to the proper destination and the client window 220 can be refreshed. In this sense, the callback causes the entry of the OTP code 244 into the proper field, and performs the equivalent function of the user entering the code and hitting the enter or return button to process the code. This can all be done automatically using callbacks or webhooks.

In another aspect, when the user is verified, the OTP code 244 can be copied and pasted to the client window 220 without even presenting it to the user in that there is no need for the user at this stage to know the code. The verification window 242 can present a result that the OTP code has been sent and accepted by the client window 220.

The client window 220 can create a receiving function that can be called by the verification window 242. There is a snippet of code (such as in JavaScript) in the verification window 242 or in the verification server 103 that can call this function. When the popup window 242 gets the OTP code 244, the code is sent through an encrypted communication or message to the client window 220 (or client server 102), and the snippet of code calls the receiving function. There are a number of different ways that this can be done. The client window 220 is sent the OTP code and the client window 220 or input field is refreshed so that the code is received and then processed as though the user had entered the code into an input field and pressed the return button on a keyboard. This approach alleviates the need for the user to manually enter or copy and paste the OTP code 244. As noted above, when this callback function is called by the verification service and used, the OTP code 244 may or may not be shown to the user as the OTP code 244 is being transmitted to the client window 220 automatically and securely. The client window or server creates or make available this certain function to receive the OTP code 244 via a different messaging or communication channel and the verify page 242 or popup or verification server 103, depending on the implementation, will call the function to achieve the task of passing the OTP code 244 to the proper destination for processing. In one example, a webhook can be used to make a call to the server 102 to pass the information and achieve the result.

The method can include sending the OTP code 244 from the verify page 242 to the client page 220 (using a communication connection enabled by a client JavaScript (JS) snippet and finally calling a JS function that expects the OTP in the client's page 220) or from the verify page/service 242 to the client server 102 through webhook. In one example of how the communication works is that a parent window (client page 220) can open a child window (verify page/pop-up 242) and establish a connection with it as describe above.

The verify page 242 can be a pop-up page, a full new page or it can load in an iframe in the client's page 220, and in all situations, similar communications happen as described above to pass the OTP code 244 to the right place without the user needing to copy and paste.

Furthermore, the OTP definition can be of different kinds of passwords such as random text, links, etc. Thus, the OTP does not have to have a particular kind of structure such as being all words.

Claim language reciting "at least one of" a set indicates that one member of the set or multiple members of the set satisfy the claim. For example, claim language reciting "at least one of A and B" means A, B, or A and B.

What is claimed is:

1. A method comprising:
   identifying that a user is at a stage of accessing a service requiring user authentication comprising one or more factors of authentication by the user;
   presenting a reference text for the user to type, wherein the reference text comprises a group of characters that is not a standard word, and wherein the reference text is chosen based on a risk associated with a type of service being accessed or is chosen to be tailored to the user;
   receiving typing characteristics related to how the user types the reference text;
   determining, based on the typing characteristics, whether the user is verified to yield a determination;
   when the determination indicates that the user is verified, presenting a one-time password to the user on a user device; and
   when the determination indicates that the user is not verified, transmitting the one-time password to the user device via a text or an email.

2. The method of claim 1, wherein the user is verified based on the typing characteristics by comparing the typing characteristics to collected typing patterns for the user.

3. The method of claim 1, further comprising:
   enrolling the user in a verification service by collecting typing patterns for the user for use in later verifying the user.

4. The method of claim 1, further comprising:
   updating a user profile for the user when the user is verified by adding the typing characteristics to the user profile.

5. The method of claim 1, wherein the determining further comprises determining whether the user is enrolled in an authentication service.

6. The method of claim 5, wherein presenting a one-time password to the user is further based on whether the user is enrolled in the authentication service.

7. The method of claim 1, wherein presenting a one-time password to the user is performed without sending the text or the email to the user device.

8. The method of claim 1, wherein, prior to presenting the reference text for the user to type, the method comprises:
   presenting an option on the user device for the user to verify based on the typing characteristics; and
   receiving a selection from the user based on the option to verify based on the typing characteristics.

9. The method of claim 1, wherein the user authentication comprises a multi-factor authentication.

10. A method comprising:
    receiving, at a network-based server, a unique identifier associated with a user that desires to access a service from an application or a website;

identifying a typing profile associated with the unique identifier;
presenting a reference text on a user device of the user, wherein the reference text comprises a group of characters that is not a standard word, and wherein the reference text is chosen based on a risk associated with a type of service being accessed or is chosen to be tailored to the user;
receiving a typing pattern of the user as the user types the reference text in the user device;
determining whether there is a match between the typing pattern and one or more previously recorded typing patterns for the user to yield a determination;
when the determination indicates that the user is verified, presenting a one-time password on a display of the user device, wherein the user enters the one-time password into an input field associated with the service; and
validating, via the network-based server, the one-time password.

11. The method of claim 10, wherein the unique identifier comprises one of a phone number or an email address.

12. The method of claim 10, wherein when the determination indicates that the user is not verified, transmitting the one-time password to the user device via a text or an email.

13. A method comprising:
receiving, at a network-based server, an indication from a user device to initiate a verification service to enable a user to gain access to a service on the user device;
based on the indication, presenting a window on the user device to enable user interaction related to authentication;
receiving, at the network-based server, a unique identifier associated with the user that desires to access the service;
identifying a typing profile associated with the unique identifier;
presenting a reference text on the user device, wherein the reference text comprises a group of characters that is not a standard word, and wherein the reference text is chosen based on a risk associated with a type of service being accessed or is chosen to be tailored to the user;
receiving a typing pattern of the user as the user types the reference text;
determining whether there is a match between the typing pattern and one or more previously recorded typing patterns for the user to yield a determination;
when the determination indicates that the user is not verified, transmitting a one-time password to the user device via a text or email, wherein the user enters the one-time password into an input field associated with the service; and
adding the typing pattern to a user profile at the verification service.

14. The method of claim 13, wherein the service is offered from an application on the user device or a website accessed from the user device.

15. The method of claim 13, wherein the user is enrolled in the verification service and the typing pattern is added to the user profile for use in a later verification.

16. The method of claim 13, wherein adding the typing pattern to the user profile at the verification service further comprises enrolling the user at the verification service and using the typing pattern added to the user profile in a later verification.

17. The method of claim 13, wherein presenting the reference text on the user device further comprises presenting the reference text in the window.

18. The method of claim 17, wherein the reference text comprises a word or a group of characters that is not a standard word.

19. A method comprising:
identifying that a user is at a stage of accessing, via a client window on a user device, a service requiring user authentication comprising one or more factors of authentication by the user;
presenting a reference text for the user to type via a verification window, wherein the reference text comprises a group of characters that is not a standard word, and wherein the reference text is chosen based on a risk associated with a type of service being accessed or is chosen to be tailored to the user;
receiving typing characteristics related to how the user types the reference text;
determining, based on the typing characteristics, whether the user is verified to yield a determination;
when the determination indicates that the user is verified, generating a one-time password; and
when the determination indicates that the user is not verified, transmitting the one-time password to the user device via a text or an email.

20. The method of claim 19, further comprising:
passing the one-time password to the client window via a callback function between the verification window and the client window.

21. The method of claim 19, further comprising:
passing the one-time password to the client window via a webhook function between a verification server and a server managing the client window.

22. The method of claim 21, wherein the passing of the one-time password to the client window enables the user to access the service without typing in or pasting the one-time password into an input field of the client window.

23. A method comprising:
receiving, at a network-based server, a unique identifier associated with a user that desires to access a service from an application or a website;
identifying a typing profile associated with the unique identifier;
presenting a reference text on a user device of the user, wherein the reference text comprises a group of characters that is not a standard word, and wherein the reference text is chosen based on a risk associated with a type of service being accessed or is chosen to be tailored to the user;
receiving a typing pattern of the user as the user types the reference text in the user device;
determining whether there is a match between the typing pattern and one or more previously recorded typing patterns for the user to yield a determination;
when the determination indicates that the user is verified, passing a one-time password to an input field associated with the service such that the user does not have to type in or past the one-time password into the input field; and
when the determination indicates that the user is not verified, transmitting the one-time password to the user device via a text or an email.

24. The method of claim 23, wherein the passing of the one-time password to an input field associated with the service occurs either via a callback between a verification window and a client window associated with the input field, or via a webhook communication between the network-based server and a server managing the client window.

25. A method comprising:
receiving, at a network-based server, an indication from a user device to initiate a verification service to enable a user to gain access to a service on the user device, the service being accessible via a client window;
based on the indication, presenting a verification window on the user device to enable user interaction related to authentication;
receiving, at the network-based server, a unique identifier associated with the user that desires to access the service;
identifying a typing profile associated with the unique identifier;
presenting a reference text on the user device, wherein the reference text comprises a group of characters that is not a standard word, and wherein the reference text is chosen based on a risk associated with a type of service being accessed or is chosen to be tailored to the user;
receiving a typing pattern of the user as the user types the reference text;
determining whether there is a match between the typing pattern and one or more previously recorded typing patterns for the user to yield a determination;
when the determination indicates that the user is verified, passing a one-time password to the client window; and
when the determination indicates that the user is not verified, transmitting the one-time password to the user device via a text or an email.

26. The method of claim 25, wherein passing the one one-time password to the client window further comprises transmitting the one-time password via a callback from the verification window to the client window or transmitting the one-time password via a webhook from the network-based server to a server managing the client window.

* * * * *